(12) United States Patent
Hayashi et al.

(10) Patent No.: US 7,319,550 B2
(45) Date of Patent: Jan. 15, 2008

(54) METHOD AND APPARATUS FOR RECORDING HOLOGRAM, METHOD AND APPARATUS FOR REPRODUCING HOLOGRAM, AND INFORMATION RETAINING BODY

(75) Inventors: Kazuhiro Hayashi, Ashigarakami-gun (JP); Katsunori Kawano, Ashigarakami-gun (JP); Yasuhiro Ogasawara, Ashigarakami-gun (JP); Jiro Minabe, Ashigarakami-gun (JP); Shin Yasuda, Ashigarakami-gun (JP); Hisae Yoshizawa, Ashigarakami-gun (JP); Norie Matsui, Ashigarakami-gun (JP)

(73) Assignee: Fuji Xerox Co., Ltd., Tokyo (JP)

( * ) Notice: Subject to any disclaimer, the term of this patent is extended or adjusted under 35 U.S.C. 154(b) by 222 days.

(21) Appl. No.: 11/006,614

(22) Filed: Dec. 8, 2004

(65) Prior Publication Data
US 2005/0231774 A1    Oct. 20, 2005

(30) Foreign Application Priority Data
Apr. 14, 2004   (JP)   ............................ 2004-119058

(51) Int. Cl.
*G03H 1/16*   (2006.01)
*G03H 1/26*   (2006.01)
*B42D 15/00*  (2006.01)

(52) U.S. Cl. ............................. 359/29; 359/22; 283/86

(58) Field of Classification Search .................... 359/2, 359/22, 29, 31, 32, 33; 283/86
See application file for complete search history.

(56) References Cited

U.S. PATENT DOCUMENTS 6,163,391 A * 12/2000 Curtis et al. .................. 359/29
6,958,967 B2 * 10/2005 Kasazumi et al. .......... 369/103

FOREIGN PATENT DOCUMENTS

| JP | A 10-340479 | 12/1998 |
| JP | A 2000-211257 | 8/2000 |
| JP | 2004-272268 | 9/2004 |

OTHER PUBLICATIONS

"A Study for Linking Between WWW and Paper by 2D Code", Human Interface 76-1, Information Media 33-1 (1998).
MYCOM PC Web, News Headline, Jul. 5, 2001; Http://pcweb.mycom.co.jp/news/2001/07/05/22.html.

* cited by examiner

*Primary Examiner*—Alessandro Amari
(74) *Attorney, Agent, or Firm*—Oliff & Berridge, PLC

(57) ABSTRACT

While Fourier transformation of a signal light beam is performed to perform recording during holographic recording so that a focal point is formed outside a holographic recording layer (defocus recording), an aperture is arranged on an outgoing side of the reproduced signal light beam (reproduction light beam), the reproduction light beam is focused at the aperture, and low-order components of a Fourier transform image of the reproduction light beam are selectively transmitted to detect only the transmitted light beam. Therefore, information recorded as the hologram in the holographic recording layer can be reproduced with high S/N ratio from the holographic recording layer added onto a support body, particularly onto a sheet member having non-optical quality such as paper and a plastic card.

15 Claims, 12 Drawing Sheets

10: ORIGINAL PAPER
12: HOLOGRAPHIC RECORDING LAYER

12: HOLOGRAPHIC RECORDING LAYER
14: PROTECTIVE FILM
10: ORIGINAL PAPER

14: PROTECTIVE FILM
12: HOLOGRAPHIC RECORDING LAYER
10: ORIGINAL PAPER

METHOD AND APPARATUS FOR RECORDING HOLOGRAM, METHOD AND APPARATUS FOR REPRODUCING HOLOGRAM, AND INFORMATION RETAINING BODY

CROSS-REFERENCE TO RELATED APPLICATIONS

This application claims priority under 35 USC 119 from Japanese Patent Application No. 2004-119058, the disclosure of which is incorporated by reference herein.

BACKGROUND OF THE INVENTION

1. Field of the Invention

The present invention relates to a method and apparatus for recording a hologram, a method and apparatus for reproducing the hologram, and an information retaining body, and particularly to a method and apparatus for recording a hologram, a method and apparatus for reproducing a hologram, and an information retaining body, in which information recorded as a hologram in a holographic recording layer is reproduced from the holographic recording layer added onto a support body, particularly onto a sheet member having a non-optical quality such as paper or a plastic card.

2. Description of the Related Art

Recently, with development in information communication equipment, development of infrastructure, and wide spread of personal computers, information can be processed on a computer, while many pieces of information can be obtained through electronic media which record and transmit information formed in an electronic format. On the other hand, paper media have been used as information media which record and transmit information. To this day, transmissions and exchanges of various pieces of information are performed by paper media such as post cards, letters, books, and newspapers.

Both the electronic media and the paper media have respective advantages. The electronic media are superior in processing properties, reusability, searching properties of the information and ease of correlation. On the other hand, the paper media are superior in at-a-glance properties, portability, and realism. Therefore, instead of the paper media being replaced with the electronic media, it is ideal that the paper media and the electronic media are complementary to each other while utilizing the advantages of both.

Information on the electronic media can be converted into information on the paper media by "printing." However, digital information of the electronic media may be lost during a printing process. Further, information on the electronic media can be converted into information on the paper media by a character recognition apparatus such as an OCR (Optical Character Reader). However, in the technique for recognizing an image, there are limits with respect to recognition performance and conversion speed.

In order to solve these problems, various methods for printing a code, by which digital conversion can be performed, such as a glyph code or a two-dimensional barcode in the paper media have been proposed. For example, a system which merges information on the WWW (World Wide Web) and information on paper media by expressing URL (Uniform Resource Locators) concerning the information printed on the paper media with a two-dimensional code and printing the two-dimensional code on the paper media (refer to "A Study for linking between WWW and paper by 2D code", Human Interface 76-1, Information Media 33-1 (1998)).

For example, a "QR code" (trademark) is available for the two-dimensional code. 134 bytes of data can be stored by utilizing the QR code (trademark) having 41 by 41 cells, and this is sufficient to describe URL information or ID information. The QR code (trademark) imparted to the paper media can be read by using the system to access the URL on the WWW, and the electronic information corresponding to the information on the paper media can be obtained as necessary.

Recently, a "μ-chip" (trademark) by which stored data can be read in a non-contact manner and which can be embedded in the paper and the like has been developed (refer to MYCOM PC WEB, NEWS HEADLINE, Jul. 5, 2001; http://pcweb.mycom.co.jp/news/2001/07/05/22.html). The information can be read in the non-contact manner by embedding the μ-chip (trademark), in which the URL information or the ID information is stored, into the paper media.

A printing apparatus that uses a transfer foil ribbon in which a holographic pattern is formed in advance to transfer and print a holographic image into a display medium such as paper with a thermal head, and a display medium produced by the printing apparatus have been proposed (Japanese Patent Application Laid-Open No. 2000-211257).

However, the above-described two-dimensional code and semiconductor chip only have a storage capacity as small as several hundred bytes. Although this storage capacity is enough for the URL information or the ID information, the storage capacity is not sufficient for the utilization of various kinds of information.

Because a thickness of the μ-chip (trademark) ranges from about 60 μm to about 120 μm, the μ-chip (trademark) can be embedded only into so-called thick paper having a thickness not lower than 200 μm. Further, the information is transmitted by wireless communication, so that a mechanism on the information retaining media side and an encryption technique tend to be complicated.

The hologram has a larger storage capacity compared with the two-dimensional code or the semiconductor chip, the holographic recording layer can be formed in a sheet, and the holographic recording layer can be easily bonded to the paper media. However, because the hologram, in which a signal light beam (object light beam) is recorded, is irradiated with a reference light beam to reproduce the signal light beam by diffraction from the hologram, there is a problem in that the signal light beam cannot be read with a high S/N ratio due to diffuse reflection on a surface of the sheet member or flexure of the sheet member, when the holographic recording layer is bonded onto a sheet member having a non-optical quality such as paper or a plastic card.

In the case of a transmission type hologram in which the recording is performed by irradiating the holographic recording layer from both the same side with the signal light beam and the reference light beam, at an ongoing side of the signal light beam, a thin film reflection layer is bonded to the sheet member. However, the surface of the reflection layer is formed along irregularity of the surface of the sheet member, so that the reproduced signal light beam is scattered when reflected by the reflection layer during holographic reproduction. As a result, reading errors are increased. In the case of a reflection type hologram, in which the recording is performed by irradiating the holographic recording layer from different sides with the signal light beam and the reference light beam, the reproduced signal light beam is not affected by the irregularity of the surface of the sheet member. However, the reference light beam is scattered on the surface of the sheet member, and the reproduced signal light beam is submerged in the scattered light beam, so that the reproduced signal light beam can not be detected.

In order to solve the problem, it is an option that the holographic recording layer is supported on a substrate whose surface has an optical quality and which has rigidity similar to the conventional holographic recording medium. However, in the information retaining body whose periphery is rigidly formed so that the holographic recording layer is not deformed, conformity between a holographic memory and a support body is lost and a sense of usefulness is largely lost.

The display medium disclosed in Japanese Patent Application Laid-Open No. 2000-211257, in which the holographic image is printed, only utilizes the holographic image in a visual manner (decoration), and the invisible electronic information is not added to the display medium. Therefore, reproduction accuracy does not become a problem.

SUMMARY OF THE INVENTION

The present invention has been made in view of the above circumstances and provides a method and apparatus for recording a hologram, a method and apparatus for reproducing a hologram, and an information retaining body, in which information recorded as the hologram in a holographic recording layer can be reproduced with a high S/N ratio from the holographic recording layer added onto a support body, particularly onto a sheet member having a non-optical quality such as paper or a plastic card.

One aspect of the present invention is to provide a method for recording a hologram in a holographic recording layer on a support body, the holographic recording method comprising irradiating a signal light beam, wherein the irradiating is conducted under one of following conditions: a focal point of the signal light beam is formed at a position that is located on a signal light beam outgoing side of said holographic recording layer and separated from the surface on the signal light beam outgoing side of said holographic recording layer along an outgoing direction by a distance exceeding a thickness of said holographic recording layer, when said holographic recording layer is irradiated with a reference light beam and the Fourier-transformed signal light beam from the same side of the holographic recording layer to record the hologram; or the focal point of the signal light beam is formed at a position located a distance from a surface on a signal light beam outgoing side of said holographic recording layer, when said holographic recording layer is irradiated with a reference light beam and the Fourier-transformed signal light beam from the different sides to record the hologram.

Another aspect of the present invention is to provide a method for reproducing a hologram comprising: arranging an aperture having a size through which low-order components of a Fourier transform image of a reproduction light beam are selectively transmitted, at a position where a focal point of the reproduction light beam is formed, the position being located on an outgoing side of the reproduction light beam obtained by irradiation of a reference light beam; and reproducing the hologram recorded in the holographic recording layer from the reproduction light beam which has passed through the aperture.

In accordance with the present invention, even in the case of an information retaining body in which the holographic recording layer is supported on a support body having a surface of less than optical quality, the light beam scattered on the surface of the support body during reproduction cannot pass through the aperture arranged on the outgoing side of the reproduction light beam and is blocked, so that the information recorded in the holographic recording layer can be reproduced with a high S/N ratio.

BRIEF DESCRIPTION OF THE DRAWINGS

Embodiments of the present invention will be described in detail based on the following figures, wherein.

DETAILED DESCRIPTION OF THE INVENTION

Figure 1:
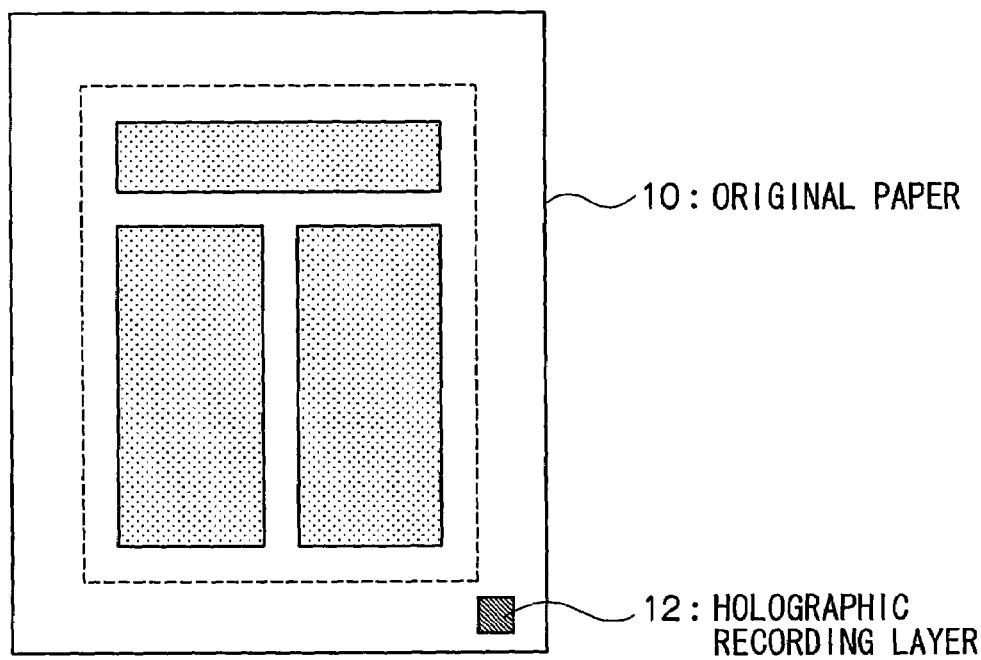
FIG. 1 is a schematic diagram showing a state in which a holographic recording layer is added to paper.

Referring to the accompanying drawing, preferred embodiments of the present invention will be described in detail.

(General Outline)

The present invention relates to a method and apparatus for reproducing information recorded in a recording layer in the form of a hologram. The holographic recording layer is added to the surface of a support body. Particularly, the invention is effective in the case where the surface of the support body is of non-optical quality. Further, usefulness is enhanced in the case of using information retaining body (holographic memory on sheet) in which the holographic recording layer is provided on the surface of a sheet member having a surface of non-optical quality as the support body.

The support body having non-optical quality is one which has a so-called optical roughened surface. The surface of the support body has a maximum surface roughness larger than a half wavelength of the reproduction light beam and/or an undulation, such as deflection and flexure, larger than the half wavelength within an irradiation area of the reproduction light beam since the support body is formed as the information retaining body. Further, the support body having the non-optical quality is one in which, even if the support body initially has the surface of an optical quality, the undulation such as bending, a dent, and the deflection is formed on the surface of the support body to lead to the non-optical quality as time goes by.

The invention is effective to read the hologram in a case in which the holographic recording layer itself is not broken but the reproduction is difficult due to a surface configuration. Namely, not only in the case where the holographic recording layer is formed on the support body having the very smooth surface or the support body having the surface of the non-optical quality, but also in the case where the hologram cannot be reproduced due to large deformation of the holographic recording layer, the holographic recording layer can be planarized by pressing to an extent that the hologram can be reproduced (to the extent that the interference condition necessary for the reproduction is established). Further, the invention is effective in the case where the support body is formed by a material (paper, resin sheet, metal plate, and the like) in which the surface of the support body itself cannot be sufficiently planarized.

In the holographic recording layer, since the information is recorded as the Fourier transform image over the irradiation range of the recording light beam, even if a part of the holographic recording layer is lost, it is highly possible to achieve reproduction even though degradation of an S/N ratio can not be avoided. Accordingly, the invention can be applied unless the Fourier transform image in the holographic recording layer is broken over the whole irradiation area of the recording light beam to the extent that the Fourier transform image is difficult to recover.

The shape of the support body can arbitrarily be formed in accordance with the application, and the support body can be formed in the shape of a cylinder such as a can, a cube, a card, and the like. However, versatile information retaining bodies in which the holographic recording layer and the sheet member are integrated can be formed by forming the sheet-like support body. Further, because the amount of attention required from a user to avoid creasing and folding of the sheet member can be reduced, the handling becomes easier.

In addition to the paper, it is possible that the sheet member is made of metals such as aluminum, plastics, and ceramics such as alumina. The sheet member of the non-optical quality includes plain paper, enamel paper, an OHP sheet, and a plastic card. For example, the surface roughness of the plain paper ranges from about 8 to about 13 µm, and the surface roughness of the plastic card is not lower than 1 µm.

As described above, in the holographic recording layer held by the support body, there is the problem that the information recorded as the hologram can not be read with a high S/N ratio due to diffuse reflection on the surface of the support body. In the invention, the reading accuracy of the information is improved by recording and reproducing the information in the following ways:

(1) During the holographic recording, the Fourier transformation of signal light beam is performed to perform the recording so that the signal light beam is focused outside the holographic recording layer (defocus recording).
(2) During the holographic reproduction, the aperture is arranged on the outgoing side of the reproduced signal light beam (reproduction light beam), the reproduction light beam is focused by the aperture, low-order components of the Fourier transform image of the reproduction light beam are selectively transmitted (noise reduction), and only the transmitted light beam is detected.

(Holographic Memory on Sheet)

In the embodiment, as shown in FIG. 1, the case in which a sheet-like holographic recording layer 12 is added onto paper 10 will be described. A reflection type hologram is recorded in the holographic recording layer 12. As mentioned later, the reflection type hologram is recorded by irradiating the holographic recording layer 12 with the reference light beam and the signal light beam from different sides.

It is possible that the holographic recording layer 12 is added to a side (surface) on which the image of the paper 10 is formed, or it is possible that the holographic recording layer 12 is added to another side (backside) on which the image of the paper 10 is not formed. When the holographic recording layer 12 is added to the surface of the paper 10, as shown in FIG. 1, it is preferable to avoid forming the holographic recording layer 12 in the area where the image is formed, and to add the holographic recording layer 12 to a margin portion located in a periphery of the area.

Figure 2A:
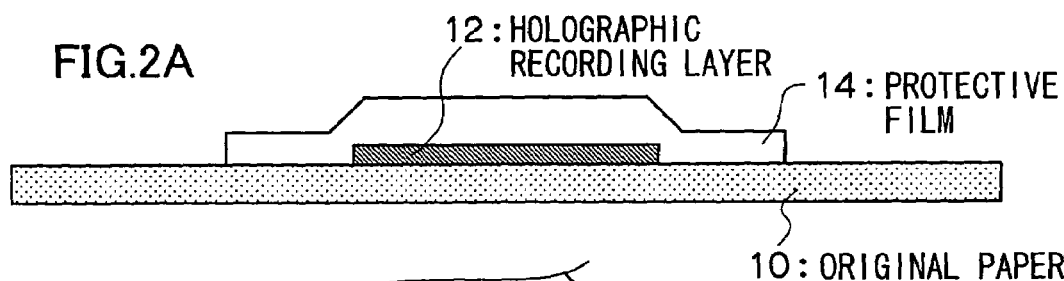
FIG. 2A is a sectional view of a part where the holographic recording layer is added to the paper.
Figure 2B:
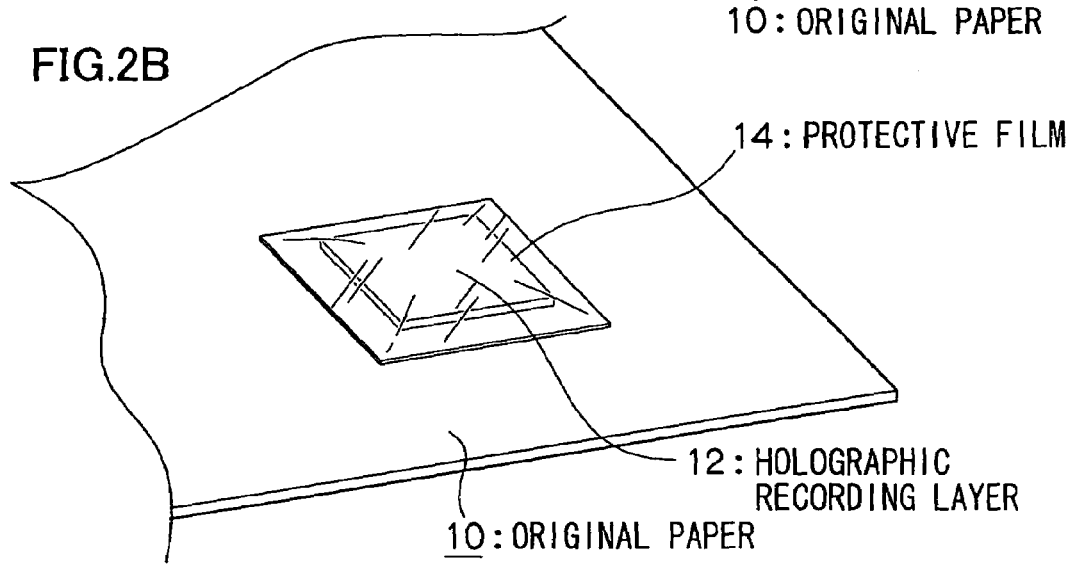
FIG. 2B is a partially enlarged view of the part where the holographic recording layer is added to the paper.
Figure 3:
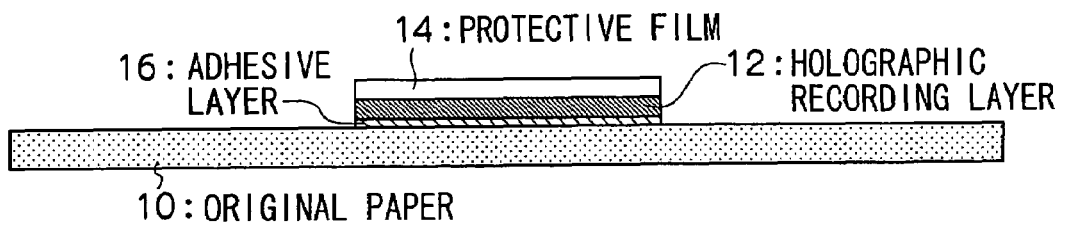
FIG. 3 is a schematic diagram showing the state in which the holographic recording layer is added to paper.

FIGS. 2A and 2B are views showing an example of the paper 10 to which the holographic recording layer 12 is added. The holographic recording layer 12 formed in a sheet-like chip having a thickness of tens micrometers and an area of several-millimeters square is bonded to the paper 10 with a transparent protective film 14. Hereinafter, the sheet-like chip prior to being bonded to the paper 10 is also referred to as "the holographic recording layer 12." As shown in FIG. 3, it is also possible that one of surfaces of the holographic recording layer 12 is directly bonded to the paper 10 through an adhesive layer 16 and the other surface is protected with the protective film 14.

The holographic recording layer 12 is not particularly limited as long as the hologram can be written in the holographic recording layer. The material forming the holographic recording layer includes photopolymers such as "OmniDex (trademark)" (product of DuPont), polymer materials exhibiting a photorefractive effect, polarization sensitive materials such as polyester having cyanoazobenzene in a side chain (see Japanese Patent Laid-Open Application No. 10-340479). In particular, the photorefractive material and the polarization sensitive material are preferable. The photorefractive materials and the polarization sensitive materials exhibit the change in the photorefractive effect or photo-induced dichroism and hold these characteristics at room temperature, so that the recorded hologram can be erased by light beam irradiation to record the new hologram, i.e. the hologram can be rewritten in the photorefractive materials and the polarization sensitive materials.

Among these, a macromolecule having a photoisomerizing group in the side chain, e.g. at least one kind of polymer which is selected from a polyester group and has the photoisomerizing group such as an azobenzene skeleton in the side chain is preferable.

Azobenzene repeats an isomerization cycle of trans-sis-trans by the irradiation of the light beam. Before the irradiation of the light beam, there are many azobenzene molecules having trans configurations. Because these azobenzene molecules have random orientations, the molecules are macroscopically isotropic. When the azobenzene molecules are irradiated with a linearly polarized light beam, the azobenzene molecules having an absorption axis in the same direction as the polarization direction are selectively isomerized into the trans-sis configuration. The molecules relaxed in the trans configuration having an absorption axis orthogonal to the polarization direction no longer absorb the light and are fixed in the trans configuration. As a result, from the macroscopic viewpoint, anisotropies of an absorption coefficient and a refractive index, i.e. the dichroism and birefringence are induced. The orientation of the macro molecule having the photoisomerization group can be changed by the photoisomerization to induce the large birefringence. The induced birefringence is stable at temperatures lower than a glass transition temperature, and the macro molecule having the photoisomerization group is suitable to the holographic recording.

For example, polyester having cyanoazobenzene in the side chain (see Japanese Patent Application Laid-Open No. 10-340479), shown in the following chemical formula, is suitable to the material in which the hologram is recorded by the above-described mechanism. In the polyester, the polarization direction of the signal light beam can be recorded as the hologram by the photoinduced anisotropy caused by the photoisomerization of the side chain in the cyanoazobenzene. The hologram can be recorded at room temperature, and the recorded hologram is semipermanently retained as long as the hologram is not irradiated with an erasing light beam.

molded material is produced by injection molding. The sheet-like holographic recording material is released from the resin film and cut into a chip having an area of several-millimeters square (for example, eight-millimeters square) for use. It is preferable that heating temperature is set to a temperature not lower than the glass transition temperature Tg of the holographic recording material, and it is preferable that press pressure ranges from 0.01 to 0.1 t/cm$^2$. For example, a polyethylene terephthalate (PET) film of which silicone resin is applied as a mold releasing agent on the surface can be used as the mold releasing resin film. The sheet-like holographic recording material is bonded to the paper 10.

The protective film 14 is formed by the resin film which is flexible and transparent to the laser beam used in the recording and reproduction. The protective film 14 may include a cohesion layer having adhesiveness, and the sheet-like holographic recording layer 12 can be held on the cohesion layer. If the holographic recording layer 12 can sufficiently be mounted on the paper 10 by contact bonding, the cohesion layer is not required. However, when the recording layer 12 is thick or when long-term stability is desired, it is preferable to form the cohesion layer on the protective film 14. Instead of lamination with the protective film 14, it is also possible that the protective film with which the holographic recording layer 12 is coated is formed by applying the resin.

In view of the prevention of the bulk height, it is preferable that the thickness of the protective film 14 ranges from 1 μm to 200 μm. Within the preferable range, it is the more preferable the protective film is thinner. In view of utilization efficiency of light beam, the transmittance of the protective film 14 to the laser beam used in the recording and reproduction is preferably not lower than 50%, and more preferably not lower than 80%. "OPP tape (trademark)" (product of NITTO DENKO CORPORATION) and the like can be used as the protective film.

After the hologram is defocus-recorded in the sheet-like holographic recording layer 12, the holographic memory on sheet is produced by adding the holographic recording layer 12 to the paper 10.

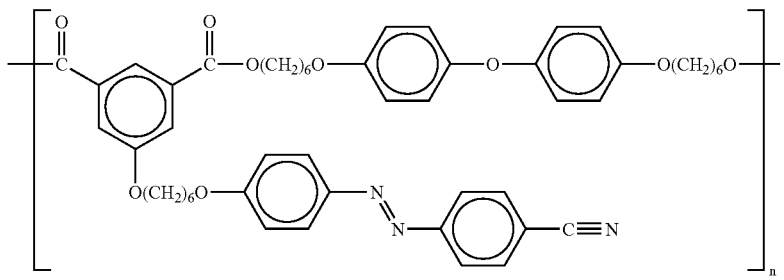

Figure 4:
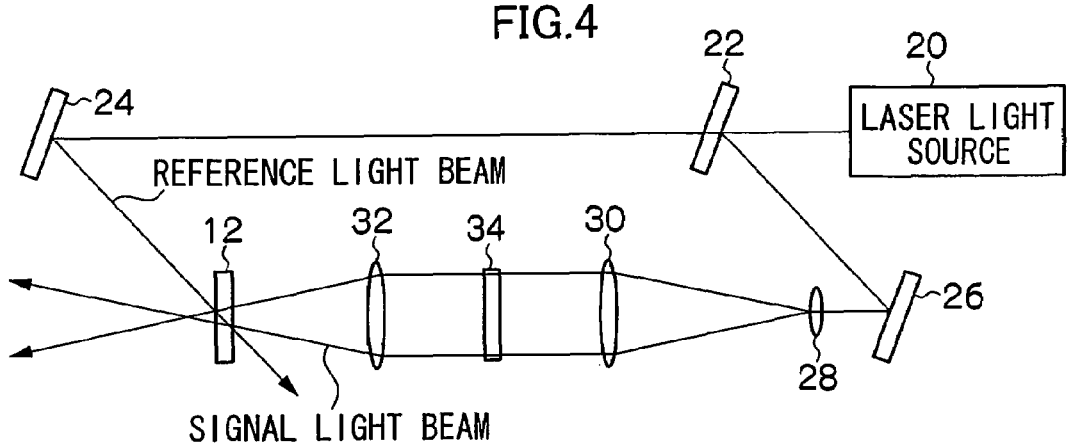
FIG. 4 is a schematic diagram of a holographic recording apparatus.

In view of the prevention of a bulk height, it is preferable that the thickness of the holographic recording layer 12 ranges from 0.1 μm to 200 μm. In order to increase diffraction efficiency, it is more preferable that the thickness of the holographic recording layer 12 ranges from 10 μm to 30 μm. The holographic recording material is formed in the sheet by performing hot pressing of the plate-shaped molded material in a vacuum in which the molded material is sandwiched with a pair of mold releasing resin films after a plate-like FIG. 4 shows the recording apparatus for recording the hologram. The recording apparatus includes a laser light source 20. The laser light source 20 oscillates and emits the laser beam which is a coherent light beam. A polarization beam splitter 22 is arranged on the side of the laser light beam irradiation of the laser light source 20. The polarization beam splitter 22 separates the laser beam into the reference light beam and the signal light beam.

A reflection mirror 24 is arranged on the light beam transmission side of the polarization beam splitter 22. The reflection mirror 24 reflects the laser beam for the reference light beam to change an optical path toward the direction of the holographic recording layer 12. The reflection mirror 24 irradiates the holographic recording layer 12 with the reflected laser beam as the reference light beam. A reflection mirror 26 and a lens system including lenses 28, 30, and 32 are arranged on the light beam reflection side of the polarization beam splitter 22. The reflection mirror 26 and the lens system reflect the laser beam for the signal light beam at a predetermined reflection angle to change the optical path toward the direction of the holographic recording layer 12.

A transmission type spatial light modulator 34 is arranged between the lenses 30 and 32. The spatial light modulator 34 is formed by a liquid crystal display device and the like. The spatial light modulator 34 modulates the laser beam for the signal light beam in accordance with the recording signal supplied from a control unit (not shown) to generate the signal light beam for recording the hologram. The lenses 28 and 30 collimates the laser beam into the beams having a large diameter to irradiate the spatial light modulator 34, and the lens 32 focuses the signal light beam which is modulated and transmitted by the spatial light modulator 34.

At this point, the signal light beam is focused so as to form the focal point at a position located a distance from the surface on the outgoing side of the holographic recording layer 12, and the holographic recording layer 12 is simultaneously irradiated with the Fourier-transformed signal light beam and reference light beam. As a result, the Fourier-transform hologram is recorded.

Figure 5:
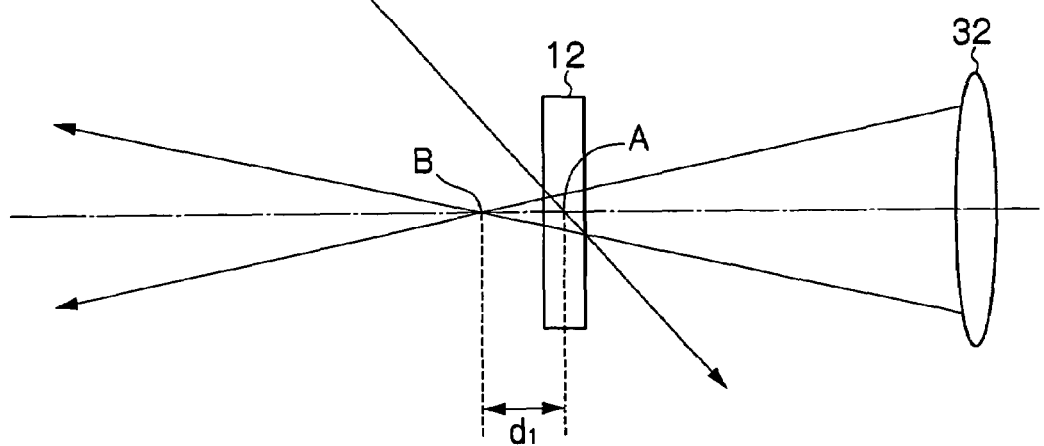
FIG. 5 is a view for explaining a focal point of a signal light beam.

As shown in FIG. 5, the amount of defocus is defined by a distance $d_1$ between a point A where the optical axes of the signal light beam and reference light beam intersect each other and a focal point B. The amount of defocus $d_1$ is preferably in the range not lower than f/20, and more preferably in the range not lower than f/10. Outside of the preferable range, because a direct-current component of the signal light beam is strong, the holographic recording can not be performed suitably. On the other hand, from the viewpoint of realization of flaw-resistant characteristics and bending-resistant characteristics which are of the features of the Fourier transform hologram, the amount of defocus is preferably in the range not lower than f/2. Here, f means a focal distance of the lens 32 used for the Fourier transformation of the signal light beam. For example, when the lens having the focal distance of 200 mm is used for the Fourier transformation of the signal light beam, the amount of defocus $d_1$ is preferably set to 10 mm, and more preferably set to 20 mm.

The holographic recording layer 12 in which the hologram is recorded is added to the paper 10 in the above-described way. As described above, for the adding method, it is possible that the holographic recording layer 12 is bonded to the paper 10 with the transparent protective film 14, or it is possible that the holographic recording layer 12 is directly bonded onto the paper 10.

(Reproduction of Hologram)

Next, the method for reproducing the hologram recorded in the holographic recording layer 12 which is added to the paper 10 will be described. The case, in which the holographic recording layer 12 is added to the paper 10 by the structure shown in FIG. 3, will be described.

Figure 6:
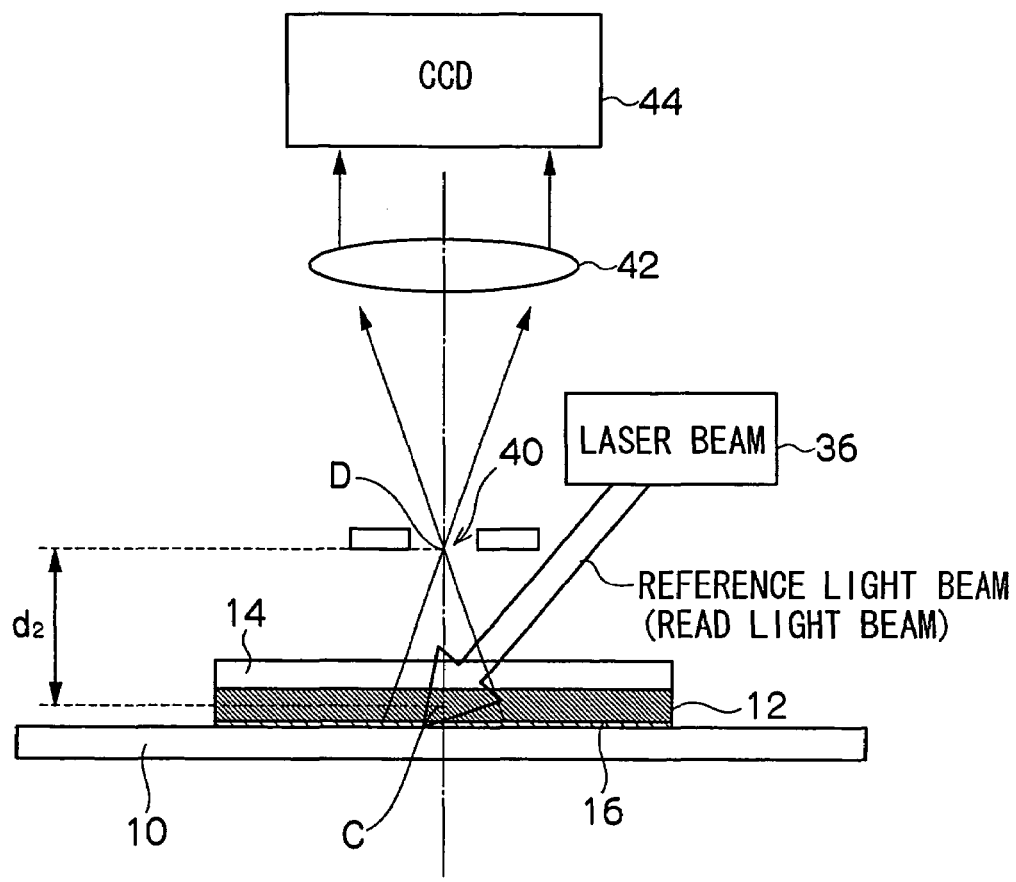
FIG. 6 is a schematic diagram of a holographic reproduction apparatus.

FIG. 6 shows the holographic reproduction apparatus for reproducing the hologram. The reproduction apparatus includes a laser light source 36. The laser light source 36 oscillates the laser beam which is a coherent light beam, and the holographic recording layer 12 added to the paper 10 is irradiated with the laser beam as the reference light beam (reading light beam). An aperture 40, a lens 42, and a detector 44 formed by an image pickup device such as CCD are arranged on the reproduction light beam outgoing side of the holographic recording layer 12. The detector 44 is connected to the control unit (not shown).

When the holographic recording layer 12 is irradiated with the reading light beam, the reference light beam is diffracted by the recorded reflection-type hologram, and the signal light beam is reproduced. At this point, although the reproduced signal light beam is not affected by irregularity of the surface of the paper 10, a part of the reference light beam is diffuse-reflected at the surface of the paper 10. However, since the aperture 40 is arranged at the position where the reproduction light beam is focused, the reproduction light beam passes through the aperture 40 while the scattered light beam is blocked. The reproduction light beam passing through the aperture 40 is collimated with the lens 42 and received by the detector 44. The received reproduction light beam is converted into an electric signal by the detector 44 and inputted to the control unit (not shown).

It is possible that the wavelength of the reading light beam differs from the wavelength of the reference light beam used in the recording. It is preferable to use the reading light beam whose wavelength is longer than that of the reference light beam used in the recording. The laser light source having the longer wavelength is not expensive, and a collecting angle of the reproduction becomes narrow to relax production accuracy of the aperture 40 by setting the reading light beam to the light having the longer wavelength.

As with the case of the recording, the amount of defocus is defined by a distance $d_2$ between a point C where the optical axes of the signal light beam and reference light beam intersect each other and a focal point D. The amount of defocus $d_2$ during the reproduction is expressed by the following equation:

$$d_1 \lambda_1 = d_2 \lambda_2$$

where $d_1$ is the amount of defocus during the recording, $\lambda_1$ is the wavelength of the reference light beam during the recording, and $\lambda_2$ is the wavelength of the reading light beam.

As can be seen from the equation, as the wavelength $\lambda_2$ of the reading light beam is increased, the amount of defocus $d_2$ during the reproduction is increased. For example, assuming that the wavelength $\lambda_1$ during the recording is set to 532 nm, the amount of defocus $\lambda_1$ is set to 10 mm, and the wavelength $\lambda_2$ of the reading light beam is set to 635 nm, the amount of defocus during the reproduction becomes 8.4 mm from the equation. In order to arrange the aperture 40 while avoiding the optical path of the reading light beam, it is preferable that the focal point of the reproduction light beam is located a distance from the holographic recording layer 12, it is more preferable that the amount of defocus is not lower than 16.8 mm, and it is further more preferable that the amount of defocus is not more than 100 mm.

It is preferable that the aperture 40 is formed having a size through which the low-order components of the Fourier transform image of the reproduction light beam can selectively be transmitted. Specifically, when the aperture 40 has the size through which the zero-order and first-order components of the Fourier transform image of the reproduction light beam can selectively be transmitted, the signal light beam can be reproduced with no errors. In order to obtain a good S/N ratio, it is preferable that the aperture 40 has a size through which the zero-order to second-order components of the Fourier transform image of the reproduction light beam can selectively be transmitted, and it is more preferable that the aperture 40 has a size through which the zero-order to third-order components of the Fourier transform image of the reproduction light beam can selectively be transmitted.

When the data image is recorded as the hologram, a Fraunhofer diffraction image of the data image is recorded with the lens. Since the Fraunhofer diffraction image is proportional to the Fourier transform image of an amplitude distribution of the data image, the recorded hologram is referred to as the Fourier transform hologram. The Fourier transform image includes a large number of spatial frequency components derived from a pixel pitch of the data image. Accordingly, even if the high-order components are cut from the reproduction light beam, the data image can be reproduced with no errors. Further, for the same reason, even if a part of the data image is lacking due to irregularity or bending of the surface of the paper 10 and flaws on the surfaces of the holographic recording layer 12 and protective layer 14, the data image can be reproduced with no errors.

Figure 7:
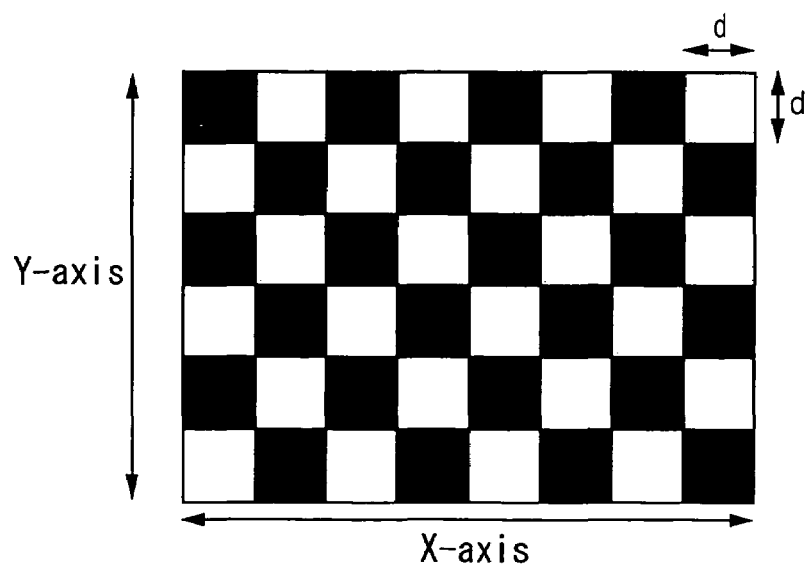
FIG. 7 shows an example of the signal light beam to be recorded.

For example, a data page recorded as the hologram may be one such as the image shown in FIG. 7. A white part in FIG. 7 represents data of "1" and a black part represents data of "0." Therefore, binary two-dimensional digital data can be recorded in each page. In this case, the size of d×d corresponds to one bit of data.

Figure 8:
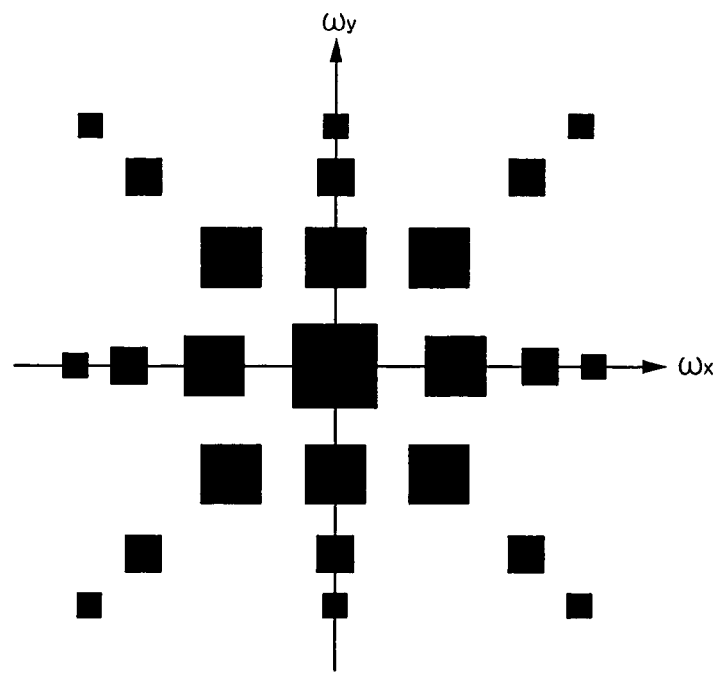
FIG. 8 shows a Fourier transform image of the signal light beam of FIG. 7.

FIG. 8 shows the Fourier transform image of the data image shown in FIG. 7. When the data image shown in FIG. 7 is recorded as the hologram, the Fourier transform image shown in FIG. 8 is reproduced. In this case, it is preferable that the aperture 40 has a size and a shape such that the low-order components of the Fourier transform image of the reproduction light beam can selectively be transmitted through the aperture. For example, it is possible that the aperture 40 is formed in the shapes shown in FIGS. 9A to 9D.

Figure 9A:
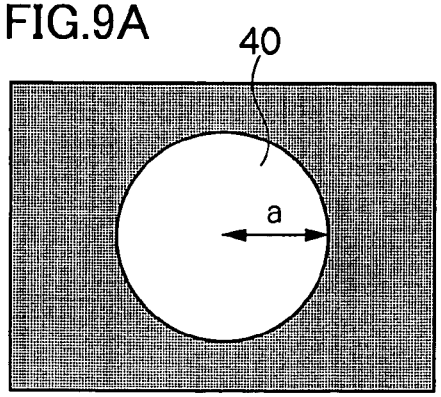
FIG. 9A shows an example of an aperture shape.
Figure 9B:
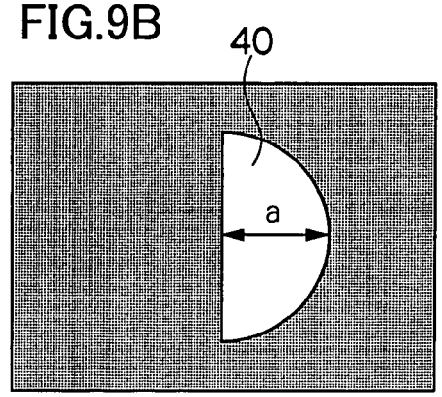
FIG. 9B shows an example of an aperture shape.

FIG. 9A shows the case in which the aperture 40 is formed in a circle having a radius a, and the zero-order component, and the first-order and second-order components in positive and negative directions for each axial direction of the Fourier transform image, are transmitted. FIG. 9B shows the case in which the aperture 40 is formed in a semi-circle having the radius a, and the zero-order component, the first-order and second-order components in the positive and negative directions for a Y-axis direction, and the first-order and second-order components in the positive direction for other axial directions of the Fourier transform image are transmitted.

Figure 9C:
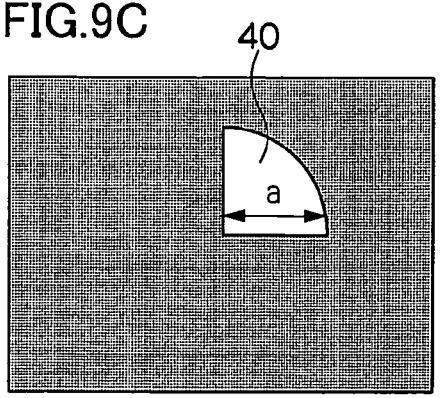
FIG. 9C shows an example of an aperture shape.
Figure 9D:
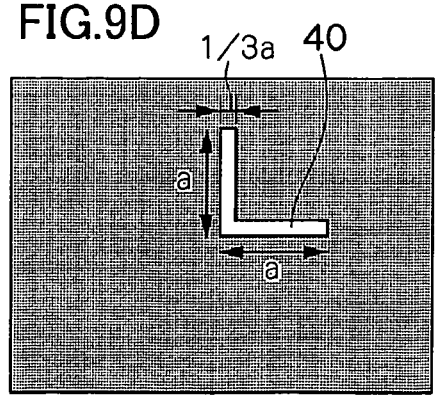
FIG. 9D shows an example of an aperture shape.

FIG. 9C shows the case in which the aperture 40 is formed in a sector (quarter round shape) having the radius a, and the zero-order component, the first-order and second-order components in the positive direction for the X-axis and Y-axis directions, and the first-order and second-order components in the direction between positive the X-axis direction and the positive Y-axis direction of the Fourier transform image are transmitted. FIG. 9D shows the case in which the aperture 40 is formed in an L-shape having a length a of a side and a width of the side of not more than a/3, and the zero-order component, and the first-order and second-order components in the positive direction for the X-axis and Y-axis directions of the Fourier transform image are transmitted.

As described above, in the embodiment, since the reflection type hologram is recorded in the holographic recording layer 12 added to the paper 10, the signal light beam reproduced from the reflection type hologram is not affected by the irregularity of the surface of the paper 10. Although a part of the reference light beam is diffuse-reflected on the surface of the paper 10, the diffuse light beam can not pass through the aperture 40, and the diffuse light beam is blocked by the aperture 40, so that only the reproduced signal light beam can be selectively obtained and the recorded information can be reproduced with a high S/N ratio.

Since the Fourier transform hologram is recorded in the holographic recording layer 12 added to the paper 10, even if a part of the data image is lacking due to irregularity or bending of the surface of the paper 10 and flaws on the surfaces of the holographic recording layer 12 and protective layer 14, the data image can be reproduced.

Further, a memory function can be added to the paper 10 by adding the holographic recording layer 12 to the paper 10. Therefore, the large-volume data can be recorded without losing portability of the paper and a degree of freedom of the shape. For example, several-megabytes of information can be recorded by performing multiplex recording in the holographic recording layer 12 with a size 10 mm by 10 mm square.

(Transmission Type Hologram)

Although the case in which the reflection type hologram is recorded in the holographic recording layer 12 is described in the above-described embodiment, the invention can also record a transmission type hologram.

Figure 10A:
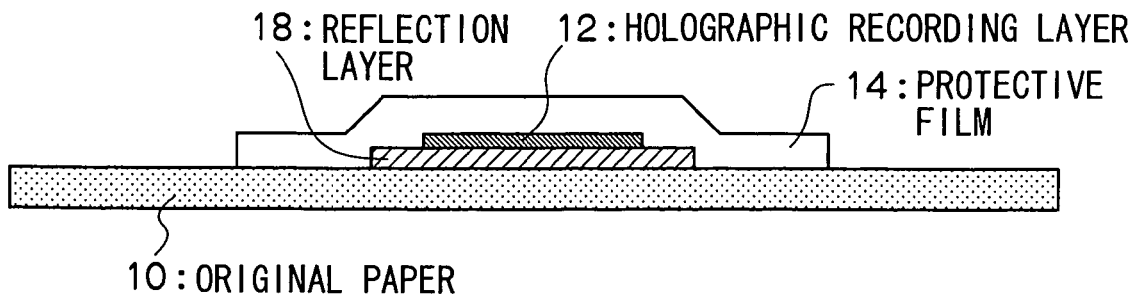
FIG. 10A is a sectional view of the part where the holographic recording layer is added to the paper.
Figure 10B:
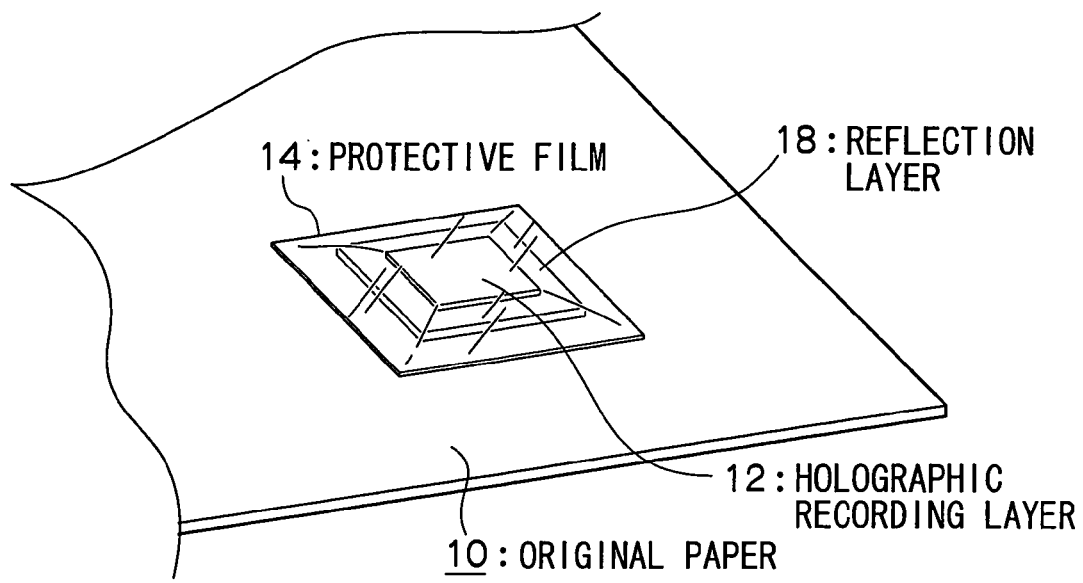
FIG. 10B is a partially enlarged view of the part where the holographic recording layer is added to the paper.
Figure 11:
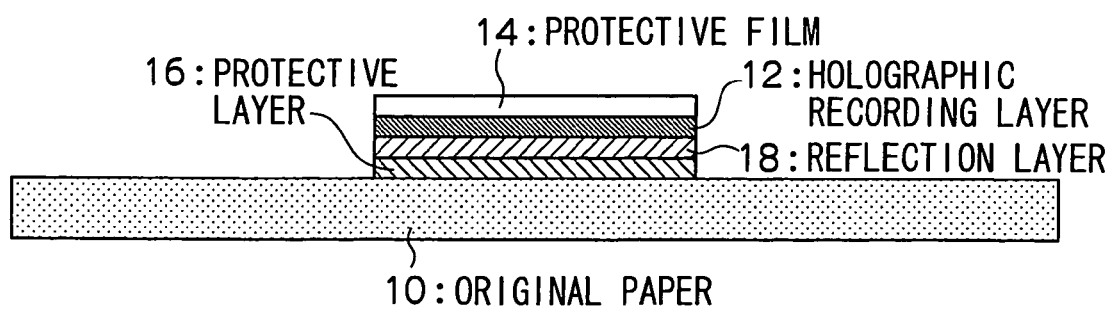
FIG. 11 is a schematic diagram showing the state in which the holographic recording layer is added to paper.

FIGS. 10A and 10B show an example of the structure when the holographic recording layer 12, in which the transmission type hologram is recorded, is added onto the paper 10. As shown in FIGS. 10A and 10B, the holographic recording layer 12 is placed on a reflection layer 18 which is larger than the holographic recording layer 12, and the holographic recording layer 12 and the reflection layer 18 are bonded to the paper 10 with the transparent protective film 14 so that the reflection layer 18 comes into contact with the paper 10. As shown in FIG. 11, it is possible that one of surfaces of the holographic recording layer 12 is directly bonded to the paper 10 through the reflection layer 18 and the adhesive layer 16 and the other surface is protected with the protective film 14.

In the reflection layer 18, the thin film is formed on the substrate such as the resin film. The thin film is made of an optical reflection material having high reflectance to the laser beam used during recording and reproducing. The optical reflection material includes metals such as Al, Ti, Fe, Co, Ni, Cu, Ag, Au, Ge, Cr, Mg, Sb, Pb, Pd, Cd, Bi, Sn, Se, In, Ga, and Rb, metallic compounds, and glass. Among these, Al, Cr, Ag, and the like are particularly suitable for the optical reflection material, and Al (aluminum) is particularly preferable for the optical reflection material. It is possible that the optical reflection material can solely be used singly, or it is possible to use the optical reflection materials by combining at least two optical reflection materials.

The reflection layer 18 can be formed by performing evaporation deposition, sputtering, ion plating, plating, or the like of the optical reflection material on the film made of polyester resin or the like. It is desirable that the thickness of the reflection layer 18 ranges from 10 to 10,000 angstrom, and it is preferable that the thickness of the reflection layer 18 ranges from 200 to 2,000 angstrom. In the case where the paper 10 has the high reflectance like the coated paper, the reflection layer 18 may be omitted.

Figure 12:
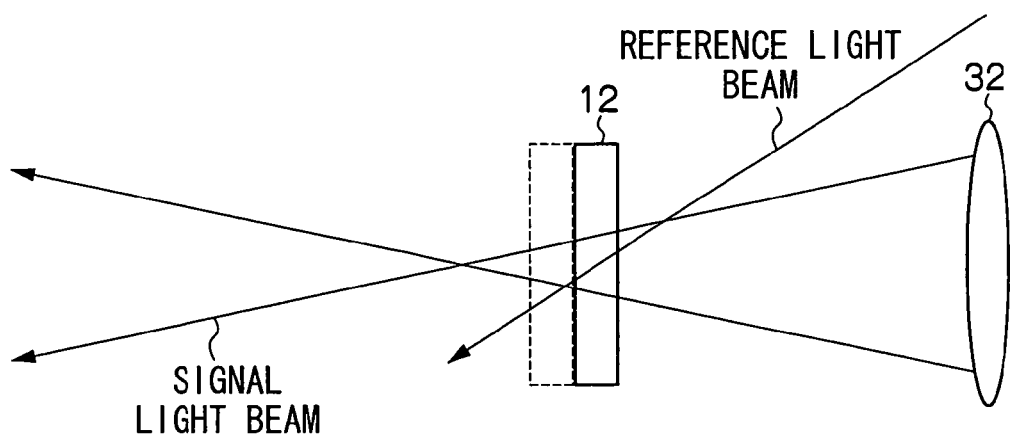
FIG. 12 is a view for explaining the focal point of the signal light beam.

As shown in FIG. 12, the transmission type hologram is recorded by irradiating the holographic recording layer 12 with the reference light beam and signal light beam from the same side. At this point, the signal light beam is focused so that the focal point of the signal light beam is formed at a position located beyond the thickness of the holographic recording layer 12 toward the outgoing direction from the surface on the signal light beam outgoing side. Namely, the distance between the surface of the holographic recording layer 12 on the signal light beam outgoing side and the focal position becomes longer than the thickness of the holographic recording layer 12. Therefore, when the reflection layer 18 is provided on the surface on the signal light beam outgoing side, the reflected signal light beam is focused outside the holographic recording layer 12.

Figure 13:
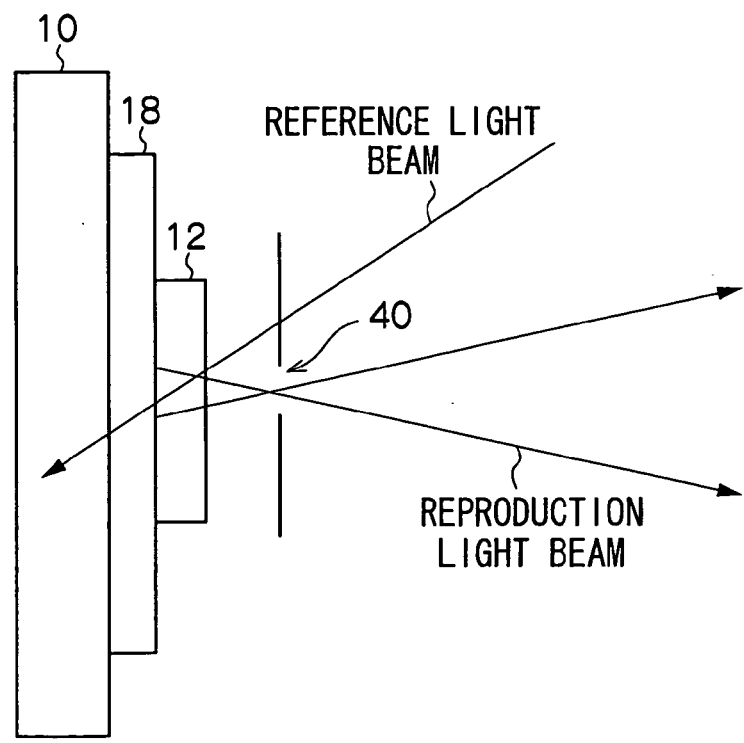
FIG. 13 shows a state in which a hologram is reproduced.

As shown in FIG. 13, during the reproduction of the hologram, when the holographic recording layer 12 is irradiated with the reading light beam, the reference light beam is diffracted by the recorded transmission-type hologram, and the signal light beam is reproduced. At this point, the reproduced signal light beam is reflected from the reflection layer 18 and outputted. Since the reflection layer 18 is formed along the surface of the paper 10, a part of the reproduction light beam is scattered by the irregularity of the surface of the paper 10. A part of the reference light beam is diffuse-reflected on the surface of the paper 10.

However, since the aperture 40 is arranged at the position where the reproduction light beam is focused, the scattered light beam cannot pass through the aperture 40 and is blocked while the reproduction light beam which has not been scattered passes through the aperture 40. Therefore, only the reproduced signal light beam can selectively be obtained and the recorded information can be reproduced with a high S/N ratio.

Since the transmission-type hologram is recorded by irradiating the holographic recording layer 12 with the reference light beam and signal light beam from the same side, the hologram can be recorded after the holographic recording layer 12 is added to the paper 10. Further, even if the hologram is already recorded, the hologram can be additionally written or rewritten by using the rewritable recording material for the holographic recording layer 12.

(Other Modifications)

A digital data image such as the bit map is recorded by the Fourier transform hologram in the above-described embodiment. In addition, images such as a logo mark, a signature, a two-dimensional barcode, and a facial portrait can also be recorded as the Fourier transform hologram. A rainbow hologram can also be recorded as information which can be directly visible. Similarly to a holographic seal bonded to a credit card, the rainbow hologram exhibits iridescence and can be confirmed by a visual check.

The information recorded in the holographic recording layer can arbitrarily be selected. For example, when the holographic recording layer is added to the paper in which the image is formed, the original information on the paper can entirely be digitized and recorded in the holographic recording layer. It is also possible that a part of the information selected from the original information on the paper can be digitized and recorded in the holographic recording layer. It is also possible to arbitrarily record information that is irrelevant to the paper such as a dynamic picture image.

From the viewpoint of increasing recording capacity, it is preferable to perform volume multiplex recording. A conventional multiplex method such as shift multiplexing and polarization multiplexing can be used as the multiplex method.

EXAMPLE 1

The commercial photopolymer film "OmniDex" (trademark, product of DuPont) having the layer structure shown below is cut into a small chip having a size of 50 mm by 50 mm, and the chip is used as the holographic recording layer.

Figure 14:
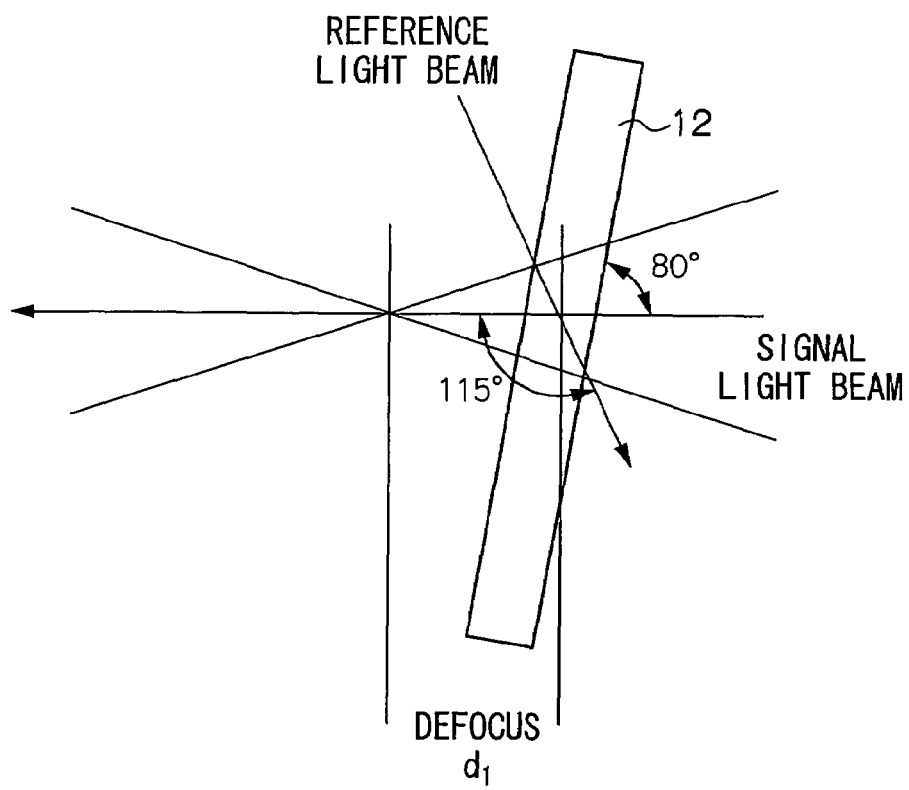
FIG. 14 is an arrangement drawing showing an arrangement of a sample (holographic recording layer) during recording.
Figure 15:
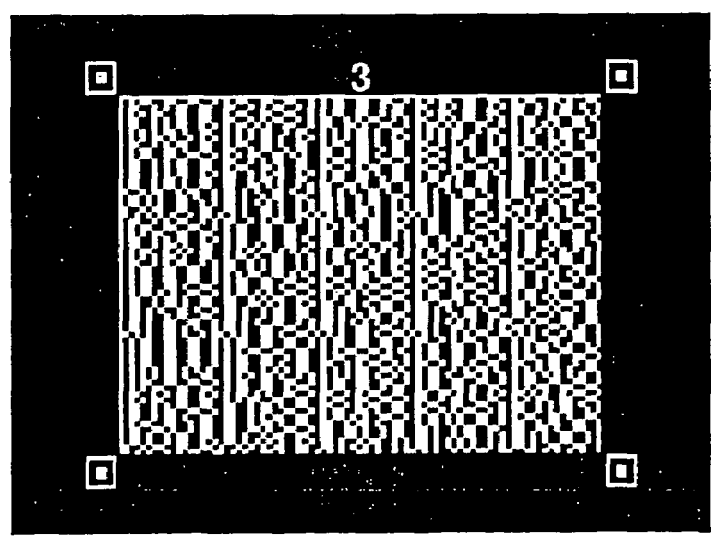
FIG. 15 shows a recording data image.

(Layer Structure of Photopolymer Film)
  Base film: thickness of 50 μm
  Photopolymer: thickness of 15 μm
  Cover film: thickness of 25 μm A reflection type hologram was recorded in the holographic recording layer with the recording apparatus shown in FIG. 5 under recording conditions shown below. FIG. 14 shows the arrangement of the sample (the holographic recording layer). FIG. 15 shows the recording data image.

(Hologram Recording Conditions)
  Recording light source: Argon laser, wavelength of 514.5 nm
  Reference light beam: parallel light beam, power of 7 mW/cm$^2$
  Signal light beam: convergent light beam, power of 5 mW/cm$^2$
  Power ratio of signal light beam to reference light beam: 0.7:1
  Intersecting angle of signal light beam and reference light beam: 115°
  Recording sample arrangement/Angle formed with optical axis of signal light beam: 80°
  Reference light beam is incident from base film side
  Signal light beam is incident from cover film side
  Focal distance of Fourier transform lens: 200 mm
  Defocus: 20 mm
  Exposure energy: 30 mJ/cm$^2$
  Exposure time: 2.5 sec
  Recording data size: 2.4 kbit After the exposure, the holographic recording layer is immediately irradiated with the reference light beam and signal light beam to record the reflection type hologram in the holographic recording layer, and then the recorded hologram is fixed by performing ultraviolet irradiation and heat treatment.

Then, the cover film is peeled off, and the holographic recording layer, in which the hologram is recorded, is bonded onto the paper.

Figure 16:
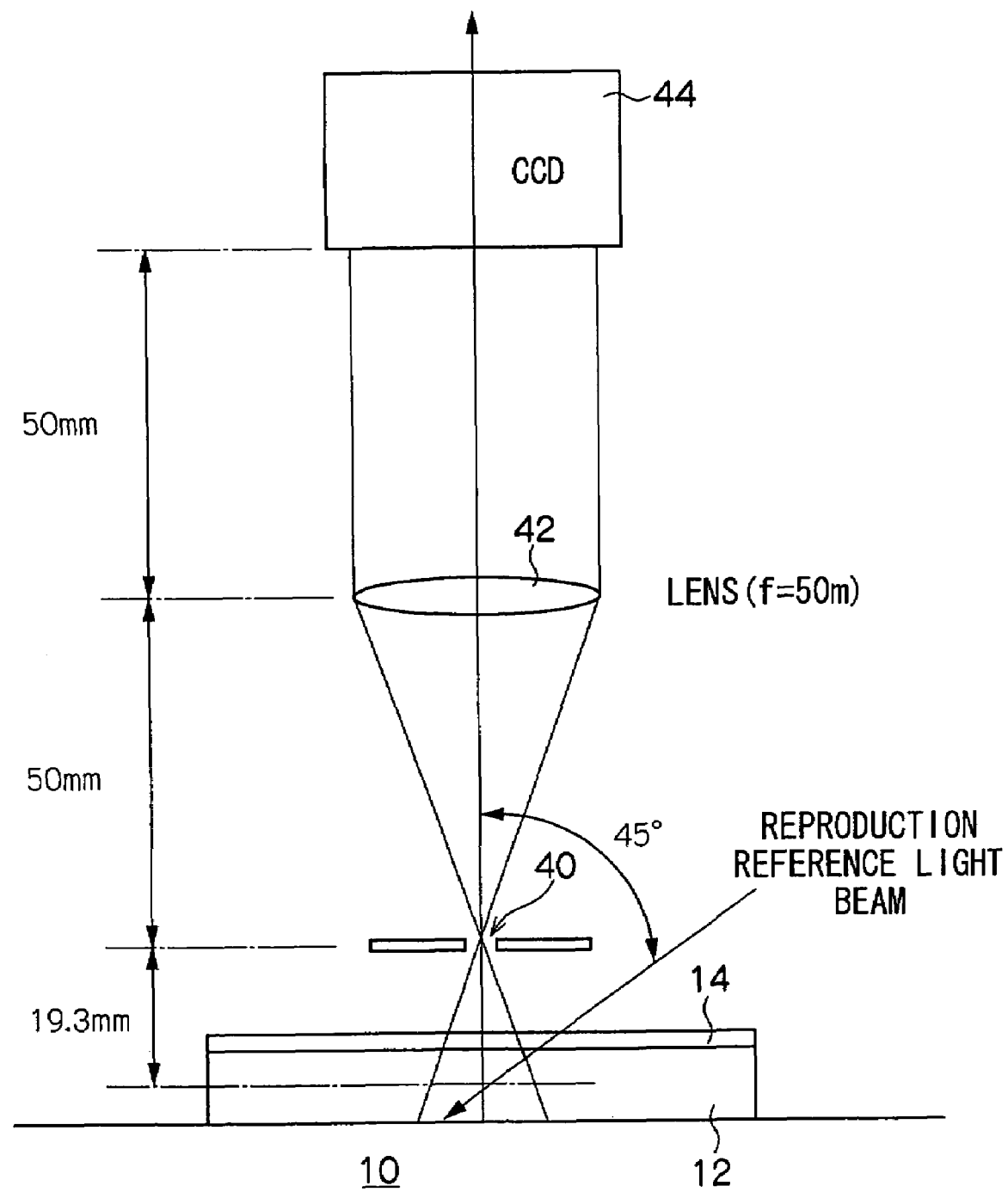
FIG. 16 is an arrangement drawing showing the specific arrangement of a reproduction optical system.

The reflection type hologram recorded in the holographic recording layer is reproduced with the reproduction apparatus shown in FIG. 6 under reproduction conditions shown below. FIG. 16 shows the specific arrangement of the reproduction optical system.

Figure 17:
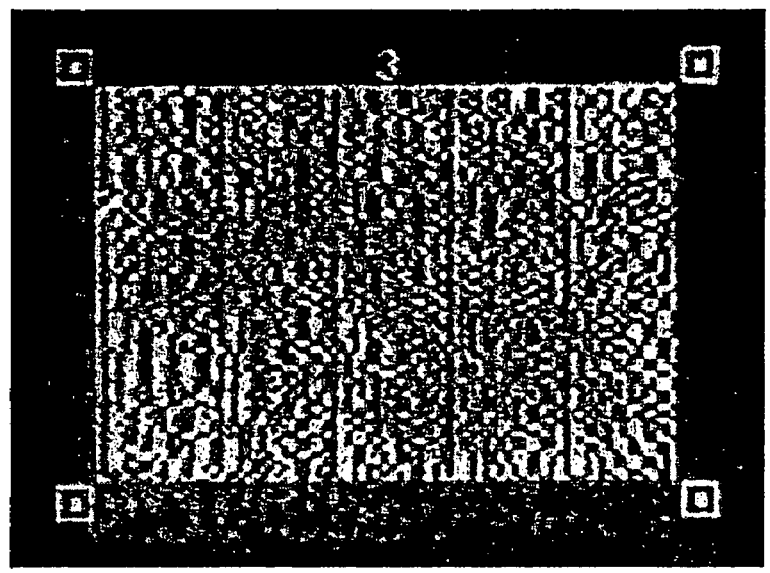
FIG. 17 shows a reconstructed data image.

(Holographic Reproduction Conditions)
  Reproduction light source: YAG-SHG laser, wavelength of 532 nm, parallel light beam
  Angle formed by normal of hologram and optical axis of reference light beam: 45°
  Aperture size: φ 1 mm The two-dimensional page data read by the detector (CCD) is decoded to reconstruct the recorded data. FIG. 17 shows the reconstructed data image. From FIG. 17, it is seen that the recording data image shown in FIG. 15 is reconstructed with a high S/N ratio.

EXAMPLE 2

The commercial photopolymer film "OmniDex" (trademark, product of DuPont) having the layer structure shown below is cut into a small chip having a size of 10 mm by 10 mm, and the chip is used as the holographic recording layer.

(Layer Structure of Photopolymer Film)
  Base film: thickness of 50 μm
  Photopolymer: thickness of 15 μm
  Cover film: thickness of 25 μm Then, the cover film is peeled off, and the holographic recording layer is bonded onto a plastic card having a thickness of 760 μm.

Figure 19:
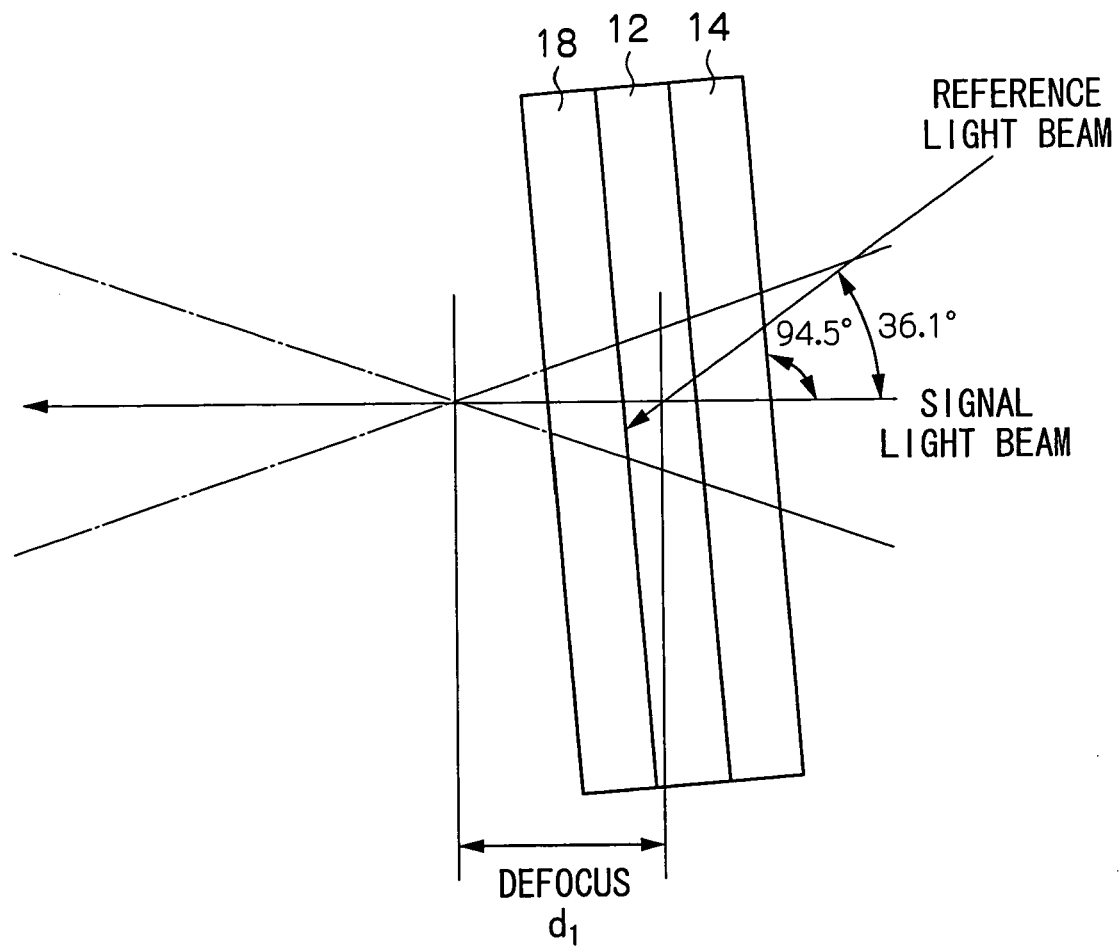
FIG. 19 is an arrangement drawing showing the arrangement of a sample (holographic recording layer) during recording.
Figure 20:
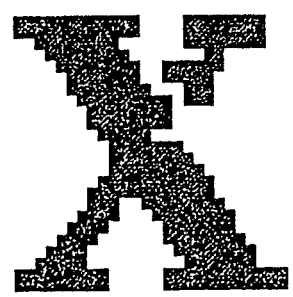
FIG. 20 shows a recording data image.

A transmission type hologram is recorded in the holographic recording layer with the recording apparatus shown in FIG. 18 under the recording conditions shown below. FIG. 19 shows the arrangement of the sample (the holographic recording layer). FIG. 20 shows the recording data image.

(Holographic Recording Conditions)
  Recording light source: Argon laser, wavelength of 514.5 nm
  Reference light beam: parallel light beam, power of 7 mW/cm$^2$
  Signal light beam: convergent light beam, power of 5 mW/cm$^2$
  Power ratio of signal light beam to reference light beam: 0.7:1
  Intersecting angle of signal light beam and reference light beam: 36.1°
  Recording sample arrangement/Angle formed with optical axis of signal light beam: 94.5°
  Focal distance of Fourier transform lens: 200 mm
  Defocus: 20 mm
  Exposure energy: 30 mJ/cm$^2$
  Exposure time: 2.5 sec
  Recording data: corporate logo
  After exposure, ultraviolet irradiation and heat treatment are performed.

Figure 18:
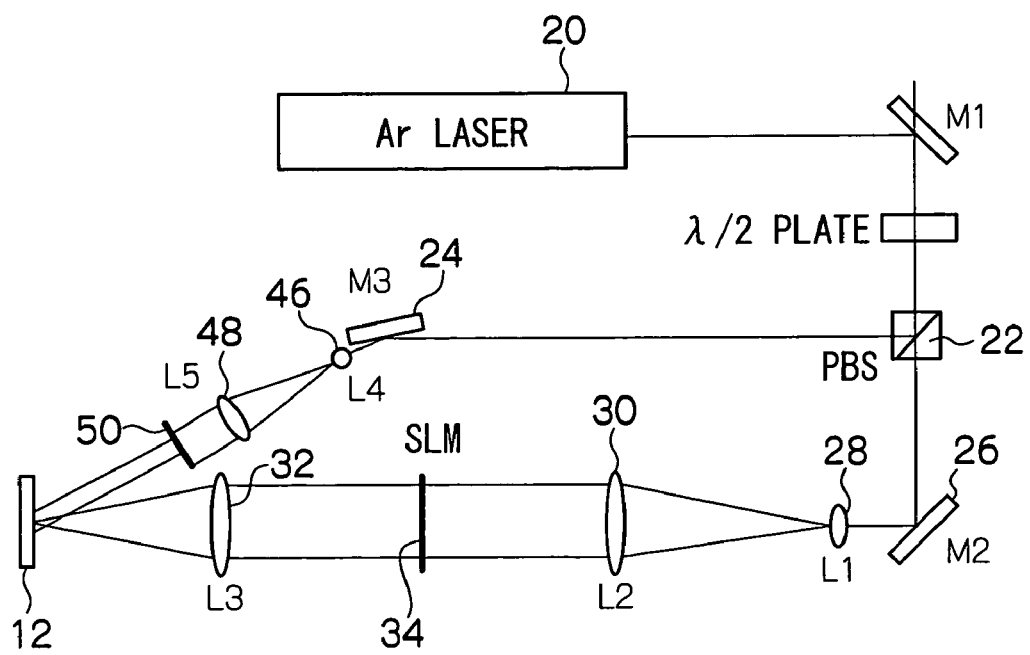
FIG. 18 is a schematic diagram of the holographic reproduction apparatus.

Except that a pair of lenses 46 and 48 and an aperture 50 are arranged between the mirror 24 and the holographic recording layer 12 while the mirror 24 is arranged so that the holographic recording layer 12 is irradiated with the reference light beam and signal light beam from the same side, the recording apparatus shown in FIG. 18 has substantially the same configuration as the recording apparatus shown in FIG. 5. Therefore, similar constituent parts are represented by the same reference numerals, and description thereof is omitted.

Figure 21:
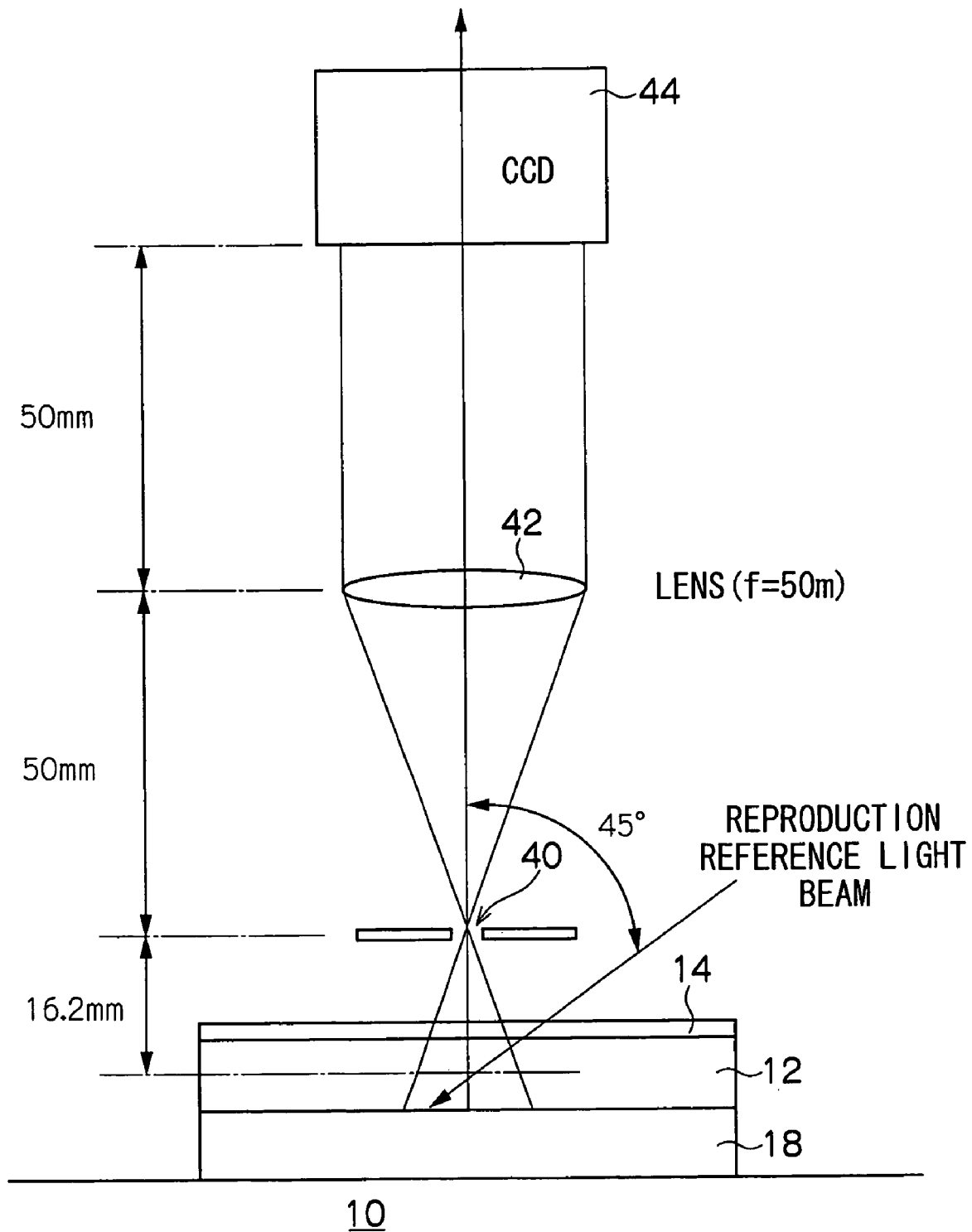
FIG. 21 is an arrangement drawing showing the specific arrangement of the reproduction optical system.

The transmission type hologram recorded in the holographic recording layer is reproduced with the reproduction apparatus shown in FIG. 6 under the reproduction conditions shown below. FIG. 21 shows the specific arrangement of the reproduction optical system.

Figure 22:
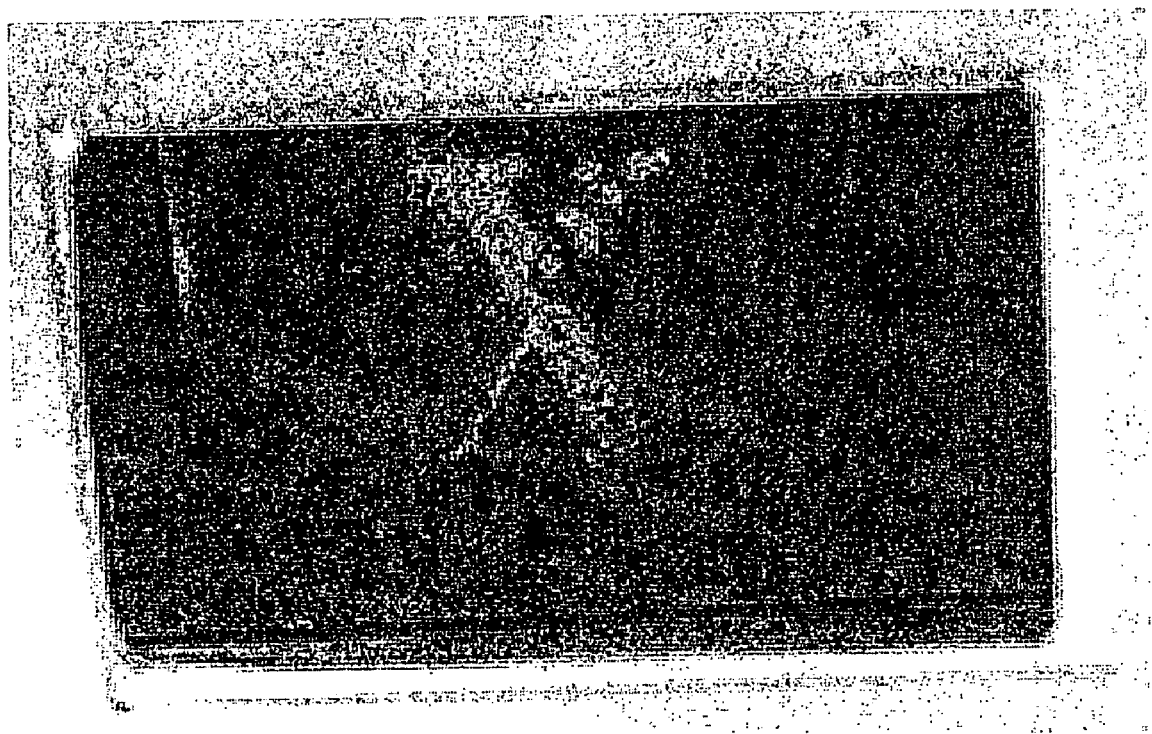
FIG. 22 shows a data image projected onto a screen.

(Holographic Reproduction Conditions)
  Reproduction light source: Semiconductor laser, wavelength of 635 nm, parallel light beam
  Angle formed by normal of hologram and optical axis of reference light beam: 45°
  Aperture size: ϕ 1 mm When the obtained reproduction light beam is projected onto a glass screen, it can be confirmed by visual check that the recorded data image was reproduced with high S/N ratio. FIG. 22 shows the data image projected on the screen. The recording data image can also be read by a detector (CCD).

What is claimed is:

1. A method for recording a hologram in a holographic recording layer on a support body, the holographic recording method comprising irradiating a signal light beam, wherein the irradiating is conducted under one of following conditions:
   a focal point of the signal light beam is formed at a position that is located on a signal light beam outgoing side of said holographic recording layer and separated from the surface on the signal light beam outgoing side of said holographic recording layer along an outgoing direction by a distance exceeding a thickness of said holographic recording layer, when said holographic recording layer is irradiated with a reference light beam and the Fourier-transformed signal light beam from the same side of the holographic recording layer to record the hologram; or
   the focal point of the signal light beam is formed at a position located a distance from a surface on a signal light beam outgoing side of said holographic recording layer, when said holographic recording layer is irradiated with a reference light beam and the Fourier-transformed signal light beam from the different sides to record the hologram; and
   wherein a distance $d_1$ between a point where an optical axis of said signal light beam and the optical axis of said reference light beam intersect each other and the focal point is in the following range:

$$f/20 < d_1 \leq f/2$$

where f is the focal point of a Fourier transform lens.

2. A holographic recording method according to claim 1, wherein said surface of said support body is of non-optical quality.

3. An apparatus for recording a hologram in a holographic recording layer on a support body, the holographic recording apparatus comprising:
   a reference light beam irradiation unit which irradiates said holographic recording layer with a reference light beam; and
   a signal light beam irradiation unit which irradiates said holographic recording layer with a Fourier-transformed signal light beam from the same side as the reference light beam so that a focal point of the signal light beam is formed at a position that is located on a signal light beam outgoing side of said holographic recording layer and separated from a surface on the signal light beam outgoing side of said holographic recording layer along an outgoing direction by a distance exceeding a thickness of said holographic recording layer,
   wherein a distance $d_1$ between a point where an optical axis of said signal light beam and the optical axis of said reference light beam intersect each other and the focal point is in the following range:

$$f/20 < d_1 \leq f/2$$

where f is the focal point of a Fourier transform lens.

4. A holographic recording apparatus according to claim 3, wherein a surface of said support body is of non-optical quality.

5. An apparatus for recording a hologram in a holographic recording layer on a support body, the holographic recording apparatus comprising:
   a reference light beam irradiation unit which irradiates said holographic recording layer with a reference light beam; and
   a signal light beam irradiation unit which irradiates said holographic recording layer with a Fourier-transformed signal light beam from a different side from the reference light beam so that the focal point of the signal light beam is formed at a position located a distance from a surface on a signal light beam outgoing side of said holographic recording layer.

6. A holographic recording apparatus according to claim 5, wherein a surface of said support body is of non-optical quality.

7. A method for reproducing a hologram comprising:
arranging an aperture having a size through which low-order components of a Fourier transform image of a reproduction light beam are selectively transmitted, at a position where a focal point of the reproduction light beam is formed, said position being located on an outgoing side of the reproduction light beam obtained by irradiation of a reference light beam; and
reproducing the hologram recorded in said holographic recording layer from the reproduction light beam which has passed through said aperture.

8. A holographic reproduction method according to claim 7, wherein a wavelength of the reference light beam, with which said holographic recording layer is irradiated during reproduction is longer than that of the reference light beam with which said holographic recording layer, is irradiated during recording.

9. A holographic reproduction method according to claim 7, wherein said aperture has the size through which zero-order to second-order components of the Fourier transform image of the reproduction light beam are selectively transmitted.

10. An apparatus for reproducing a hologram which is recorded in a holographic recording layer on a support body, the holographic reproduction apparatus comprising:
a reference light beam irradiation unit which irradiates said holographic recording layer in which the hologram is recorded, with a reference light beam;
an aperture having a size through which low-order components of a Fourier transform image of a reproduction light beam are selectively transmitted and being arranged at a position where a focal point of the reproduction light beam is formed, said position being located on an outgoing side of the reproduction light beam obtained by irradiation of the reference light beam; and
a detection unit which detects the reproduction light beam which has been transmitted through said aperture.

11. An information retaining body comprising:
a support body; and
a holographic recording layer which on said support body, wherein said holographic recording layer is irradiated with a signal light beam under one of following conditions:
a focal point of the signal light beam is formed at a position that is located on a signal light beam outgoing side of said holographic recording layer and separated from a surface on the signal light beam outgoing side of said holographic recording layer along an outgoing direction by a distance exceeding a thickness of said holographic recording layer, when said holographic recording layer is irradiated with a reference light beam and the Fourier-transformed signal light beam from the same side of the holographic recording layer to record the hologram, or
the focal point of the signal light beam is formed at a position located a distance from the surface on a signal light beam outgoing side of said holographic recording layer, when said holographic recording layer is irradi-ated with the reference light beam and the Fourier-transformed signal light beam from different sides of the holographic recording layer to record the hologram; and
wherein a distance $d_1$ between a point where an optical axis of said signal light beam and the optical axis of said reference light beam intersect each other and the focal point is in the following range:

$$f/20 < d_1 < f/2$$

where f is the focal point of a Fourier transform lens.

12. An information retaining body according to claim 11, wherein a surface of said support body is of non-optical quality.

13. An information retaining body according to claim 11, wherein said support body is sheet-like, and a surface of the sheet-like support body is of non-optical quality.

14. A method for recording a hologram in a holographic recording layer on a support body and reproducing the hologram from the holographic recording layer, the method comprising:
recording by irradiating a reference light beam and a Fourier-transformed signal light beam from the same side of the holographic recording layer so that a focal point of the signal light beam is formed at a position that is located on a signal light beam outgoing side of said holographic recording layer and separated from a surface on the signal light beam outgoing side of said holographic recording layer along an outgoing direction by a distance exceeding a thickness of said holographic recording layer;
arranging an aperture having a size through which low-order components of a Fourier transform image of a reproduction light beam are selectively transmitted, at a position where a focal point of the reproduction light beam is formed, said position being located on an outgoing side of the reproduction light beam obtained by irradiation of a reference light beam; and
reproducing the hologram recorded in said holographic recording layer from the reproduction light beam which has passed through said aperture.

15. A method for recording a hologram in a holographic recording layer added to a surface of a support body and reproducing the hologram from the holographic recording layer, the method comprising:
recording by irradiating a reference light beam and a Fourier-transformed signal light beam from different sides of the holographic recording layer so that a focal point of the signal light beam is formed at a position located a distance from a surface on a signal light beam outgoing side of said holographic recording layer;
arranging an aperture having a size through which low-order components of a Fourier transform image of a reproduction light beam are selectively transmitted, at a position where a focal point of the reproduction light beam is formed, said position being located on an outgoing side of the reproduction light beam obtained by irradiation of a reference light beam; and
reproducing the hologram recorded in said holographic recording layer from the reproduction light beam which has passed through said aperture.

* * * * *